United States Patent Office 2,940,428
Patented June 14, 1960

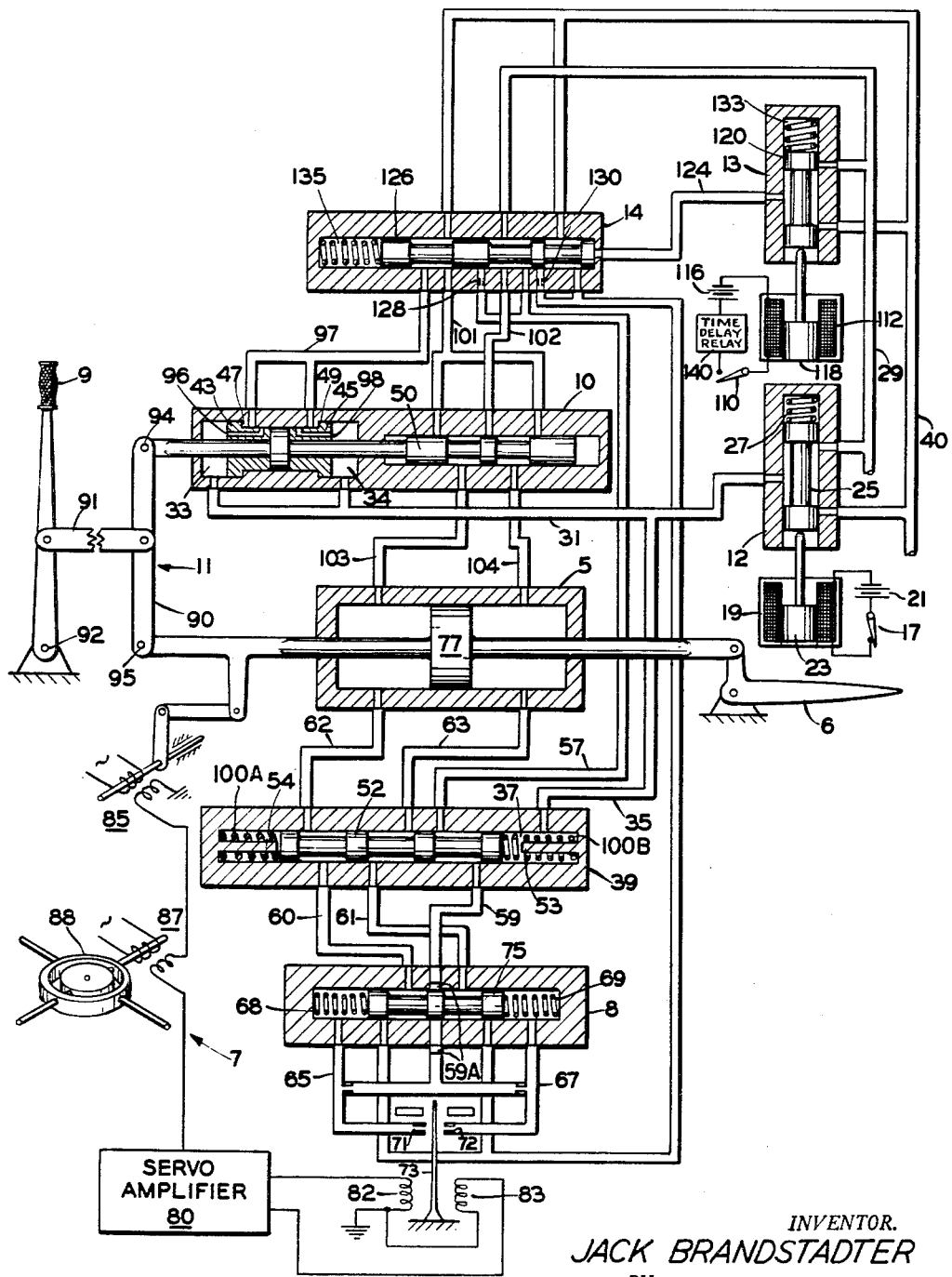

2,940,428

PARALLEL HYDRAULIC CONTROL SYSTEM

Jack Brandstadter, New York, N.Y., assignor to Bendix Aviation Corporation, Teterboro, N.J., a corporation of Delaware Filed Aug. 10, 1954, Ser. No. 448,878

7 Claims. (Cl. 121—41)

This invention relates generally to control systems and more particularly to control systems whose power means are fluid operated and are actuated manually and automatically.

In control systems having fluid operated power means, the characteristics of the controller or transfer valve for the power means is such that, when the controller is designed for optimum manual operation, the design usually does not permit optimum automatic operation. Conversely, when the control is designed for optimum automatic operation, the design usually does not permit optimum manual operation.

An object of the present invention, therefore, is to provide a novel servosystem whose power means is arranged for optimum manual and automatic control.

Another object is to provide a servosystem whose power means is manually and automatically controlled and has an arrangement for safely transferring control from manual to automatic.

A further object is to provide a novel servosystem whose fluid operated power means is selectively operable manually and automatically and in which the manually operable controller follows the operation of the system by the automatic control.

A still further object is to provide a novel fluid operated servosystem which is selectively manually and automatically controlled but wherein the manual control can override the automatic control.

The present invention contemplates a novel servosystem having a fluid operated power means controlled from a pair of parallel connected flow control means or actuators, one actuator being operated from a manual control system and the other actuator being operated from an automatic control system. The novel arrangement contemplated makes it possible for the manual control system to override the automatic control system. A novel interlock arrangement prevents the automatic control system from opposing the operation of the power means by the manual control system when the manual control system is to override the automatic control system. A novel interlock release and low velocity device provides for reengaging the automatic control system for limited action of the power means until such time as the automatic control system demonstrates that it is functioning properly. The contemplated arrangements also provide for the manual control system to follow the operation of the automatic control system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically the novel servosystem of the present invention incorporated in a control system for operating the control surface of an aircraft.

In the novel servosystem illustrated as controlling an aircraft, a hydraulic ram 5 displaces a control surface 6 of the craft in response to fluid flow actuation from one of two parallel control systems: the automatic control system comprising an automatic pilot system 7 and a transfer valve 8; and the manual control system comprising a manually operable stick 9 and a holding and interlock valve 10. A differential linkage 11 permits stick 9 to follow the operation by the automatic control system. Solenoid operated valve 12 provides for engagement of the system, and solenoid operated valve 13 and a valve 14 provides for slow and safe transfer of control.

Turning now to the drawing, the novel control system is illustrated as being in condition for operating the aircraft control surface from the automatic control system. Switch lever 17 is in a closed position so that solenoid 19 is energized from battery 21. Plunger 23 holds spool 25 of valve 12 in a raised position against the bias of spring 27 and allows fluid from conduit 29 at system pressure to flow by way of conduit 31 to chambers 33 and 34 of the holding and interlock valve 10 and by way of conduit 35 to a chamber 37 at one end of cut-off valve 39. This pressure fluid may be supplied by any conventional type pumping system, only the pressure line 29 and drain or sump line 40 being shown.

The pressure fluid in chambers 33 and 34, acting against pistons 43 and 45, press the pistons against shoulders 47 and 49 to center and relatively fix spool 50. The pistons are designed to have an area such that the force locking spool 50 in centered position is great enough to hold the spool against the dynamic forces resulting from the inertia of stick 9 and linkages 11 when the craft is accelerated but not so great that the human pilot cannot readily overpower the locking action by movement of stick 9.

The pressure in chamber 37 moves spool 52 from a position against stop 53 to the position, as shown, against stop 54. This position of spool 52 allows pressure fluid from conduit 57 to flow through conduit 59 and channel 59A to transfer valve 8 and from transfer valve 8 to the hydraulic ram 5 through either conduit 60 or 61 and conduit 62 or 63. Channel 59A forms an annulus encircling spool 75 so that pressure fluid can flow through valve 8 even though the spool is centered.

Transfer valve 8 may be generally similar to the valve described in U.S. Patent No. 2,625,136. In the embodiment herein, the pressure fluid flows continuously through conduit 59 to conduits 65 and 67 to chambers 68 and 69 and through orifices 71 and 72 to sump. When a cantilevered armature 73 is centered, the flow through orifices 71 and 72 is equal and spool 75 remains in a center position. When armature 73 is moved to the right or to the left of center the flow through one of these orifices is restricted and a greater flow is permitted through the other. The resulting differential pressure in chambers 68 and 69 forces spool 75 to the right or left. Depending upon the direction of this movement, the pressure fluid from conduit 59 is conducted through a conduit 60 or 61, and a corresponding conduit 62 or 63 to one side of a piston 77 in hydraulic ram 5. Thus, the direction of movement of piston 77 is controlled by the direction and amount of movement of armature 73 from its centered position.

Armature 73 is moved in response to output from an amplifier 80 which is the signal from automatic control system 7. To this end, a pair of coils 82 and 83 surrounding armature 73 are differentially energized in a direction and in amount corresponding to the phase and amplitude, respectively, of the signal from the signal chain of the automatic pilot system 7.

Conventional automatic pilot systems control an aircraft about its three axes of control. Although control surface 6 may be any one of three conventional control surfaces of the craft, it is illustrated herein as the elevator surface for purposes of convenience. The automatic control system 7 for this surface may be of any conventional type and is illustrated herein simply as being comprised of a signal chain including a follow-up inductive device 85 and a pitch inductive device 87. In a well-known manner, inductive device 87 is connected to the Gimble axis of a vertical gyroscope 88 for relative displacement as a craft is displaced from a predetermined pitch attitude to develop a corresponding signal. After amplification in amplifier 80, this signal operates transfer valve 8 to actuate hydraulic ram 5 until control surface 6 has been moved an amount such that the signal resulting from the displacement of the rotor of inductive device 85 relative to stator is equal and opposite to the signal from inductive device 87. The net input signal to amplifier 80 at this time is zero and armature 73 is centered so that displacement of surface 6 is stopped.

In order that the human pilot may have knowledge of the operation of the surface 6 by the automatic control system, the novel arrangement includes differential linkage 11 and the holding feature comprised of spool 50 and pistons 43 and 45. The shaft of piston 77 of ram 5 is connected to manual controller 9 by differential linkage 11. To this end, a link 90 pivotally connects the shafts of spool 50 and piston 77 and a link 91 pivotally connects controller 9 and link 90. Controller 9 is pivoted on a pin 92. During automatic operation, pistons 43 and 45 hold spool 50 centered so that pin 94 is in effect a fixed pivot point. Accordingly, the movement of piston 77 rotates link 90 about pin 94, and link 91 constrains controller 9 to follow the action of the surface 6.

Summarizing the operation of the system under the automatic control configuration, the circuit formed by closing switch 17 energizes solenoid 19, lifting spool 25 and permitting pressure fluid to lock the manual control transfer valve 50 in center position and to open cut-out valve 39 by moving spool 52 against abutment 54. The pressure fluid is supplied by way of conduits 57, 59, 65 and 67 to chambers 68 and 69 of transfer valve 8 whose spool 75 remains centered when the pressure is equal on both chambers.

Should the craft deviate, however, from its predetermined attitude, the signal, which is developed at inductive device 87 and which corresponds in phase and amplitude to the extent or direction of displacement, energizes coils 82 and 83 differentially so as to move armature 73 to the left or right of center. As a result of the further opening and closing of orifices 71 and 72, a differential pressure builds up in chambers 68 and 69 and moves spool 75 from its center position. This sets up a differential pressure on piston 77 of hydraulic ram 5 driving the piston in a direction to operate surface 6 to correct for the deviation of the craft from its predetermined attitude. Piston 77 moves surface 6 until such time as the rotor of inductive device 85 is displaced to build up a signal equal and opposite to the signal at inductive device 87. At this time, the net input to amplifier 80 is zero and armature 73 returns to central position.

During the course of operation of the craft by the automatic control system, the human pilot may desire to control the surface manually. Moving controller 9 at this time pivots link 90 about pin 95 and displaces spool 50 from its center position. Displacement of spool 50 to the left releases the pressure in chamber 33 through conduit 96 in piston 45 and conduit 97 to sump line 40, and displacement to the right releases the pressure in chamber 34 through conduits 98 and 97. This also releases the pressure in leads 31 and 35. Spring 100A being stronger than spring 100B and overcoming the residual pressure in chamber 37 drives spool 52 to the right against abutment 53, cutting off the operation of transfer valve 8 by automatic pilot system 7 so that the automatic control system can not oppose the manual operation. Moving spool 50 to the left or right of the center position shown permits pressure fluid from conduit 102 to be fed selectively to conduits 103 and 104 and to either side of piston 77.

By momentarily overpowering the pressure exerted on locking pistons 43 and 45 by the pressure fluid in chambers 33 and 34, the human pilot relieves the fluid pressure opposing him and renders the automatically controlled transfer valve 8 ineffective on ram 5. Pistons 43 and 45 remain in their displaced position since the fluid pressure from conduit 31 and 35 is bled by conduit 96 or 98 to conduit 97.

During the course of manual operation of the craft, the human pilot has no way of knowing how well the automatic control system is functioning. Therefore, should control of the craft be changed immediately from manual to automatic control and the automatic control be malfunctioning, the control surface may be moved so rapidly as to place the craft in a dangerous attitude before the human pilot can regain control of the craft. The present invention obviates this possibility by limiting the authority of the automatic control system upon initial engagement for a long enough interval of time for the human pilot to determine whether the automatic control is operating satisfactorily.

To reengage the automatic control system, switch arm 110 is moved to a closed circuit position. This energizes solenoid 112 from battery 116, and plunger 118 moves spool 120 of valve 13 against the bias of spring 133. Line pressure from conduit 29 is applied through conduit 124 to the end of spool 126, moving the spool to the left. The position of the lands of spool 126 permits pressure fluid to flow from conduit 29 to conduit 57; however, the action of orifice 128 restricts the flow of pressure fluid and the action of orifice 130 restricts the flow to sump so that operation by transfer valve 8 and ram 5 is slowed. As long as solenoid 112 is energized spool 126 remains in a position displaced to the left. A conventional time-delay switch 140 is included in the circuit to solenoid 112 so that, after a predetermined period of time, the solenoid is de-energized. The pressure in conduit 124 is released to sump line 40 due to the biasing action of spring 133 returning spool 120 to the position shown and spring 135 returns spool 126 to the normal position shown. Full line pressure thereafter is supplied to transfer valve 8 and ram 5. The automatic control system is again operating at full power yet may still be overpowered by the manual controller as described above.

The foregoing has presented a novel fluid operated control system wherein two transfer valves are connected in parallel for the operation of a hydraulic ram, one valve being operated manually and the other automatically. The manual operation may override the automatic operation and, when a change is made from manual to automatic operation, the control by the automatic system is slowed for an interval of time so that a determination can be made as to whether the automatic control is functioning properly before a complete release to automatic control is made.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

I claim:

1. In a servosystem, fluid operated power means, first and second flow control means, manual control means for operating said first flow control means for controlling said power means, automatic control means for operating said second flow control means for controlling said power means, and means for changing the control of said power means from said first to said second flow control means including flow restricting means for temporarily restricting the control of said power means by said second flow control means for a predetermined time after a transfer of control from said first to said second flow control means whereby should the automatic control means be malfunctioning, the power means may be controlled again manually before a dangerous control condition arises.

2. In a servosystem, fluid operated power means, a source of pressure fluid, first flow control means operatively connected with said source and said power means for controlling the supply of pressure fluid to said power means and adapted to be operated by one control system, second flow control means operatively connected with said source and said power means for controlling the supply of pressure fluid to said power means and adapted to be operated by another control system, and an interlocking system including pressure responsive cut off means biased to a normal position for cutting off the supply of pressure fluid to said first flow control means, pressure operated locking means capable of temporarily locking said second flow control means in an inoperative position, control means operable in one sense for supplying pressure fluid to said cut off means to urge the latter to a position to render said first flow control means effective and said control means including means effective upon operation of said control means in said one sense for supplying pressure fluid to said locking means to provide a predetermined force to lock and render said second flow control means ineffective, and other control means operative in a sense for providing a force for initially overcoming said predetermined force of said locking means to render said second flow control means effective and said locking means including means effective upon operation of said other control means in said sense for exhausting the pressure fluid at said locking means and at said cut off means so that said cut off means is biased to said normal position and said first flow control means is rendered ineffective.

3. In a control system, a fluid operated ram, a source of pressure fluid, first and second flow control means for regulating the supply of pressure fluid to said ram, each having a movable spool for controlling said ram, a pressure operated valve between the pressure source and said first flow control means resiliently biased to a position for cutting off the supply of fluid to said first of said flow control means, an automatic control system for operating the spool of said first flow control means, a manual control system for operating the spool of said second flow control means, a centering arrangement for said second flow control means comprised of a pair of pistons operatively connected to said source of fluid pressure for moving the spool to a centered position whereby the spool is rendered ineffective to control said ram, means for connecting said pressure fluid source and said valve whereby said valve is moved to a position permitting the flow of fluid pressure to said first flow control means to render the latter effective, means for moving the spool of said second flow control means manually, and said pistons including normally closed fluid conduit means therein, the conduit means in one of said pistons being adjustably positioned to an open position upon manual movement of the spool of said second flow control means, the conduit means of said one piston being so arranged that the opening thereof effects a releasing of the pressure fluid action on said one piston and on said valve for causing said valve to be resiliently biased to the position for rendering said first flow control means ineffective.

4. In a control system, for a surface of an aircraft, fluid operated power means for moving said surface, a manually operable transfer valve for controlling said power means, an automatically operable transfer valve for controlling said power means, selective means for operating said power means from one of said transfer valves including means for normally holding said manually operable transfer valve in an inoperative position while said automatically operable transfer valve is controlling said power means, means for rendering said automatically operable transfer valve inoperative when said manually operative transfer valve is manually moved from the inoperative position, and means for temporarily restricting the operation of said automatically operable transfer valve after a return to automatic control is made from manual control.

5. In a servosystem of a type including a fluid operated power means, a source of pressure fluid, first and second flow control means for regulating the supply of pressure fluid to said power means having conditions selectively effective for controlling said power means, automatic control means for operating said first flow control means, manual control means for operating said second flow control means, pressure responsive locking means providing a predetermined force for hydraulically locking said second flow control means in a condition ineffective to control said power means when said first flow control means is in a condition effective to control said power means, and means operable for manually exerting a force on said locking means greater than said predetermined force so as to place said second flow control means in a condition effective to control said power means; the improvement comprising said locking means including normally closed fluid conduit means, said fluid conduit means being opened upon said second flow control means being placed by the manually operable means in the condition effective to control said power means, and valve means operatively controlled by the opening of the conduit means for placing said first flow control means in a condition ineffective for controlling said power means.

6. A system comprising fluid operated power means, a source of pressure fluid, first flow control means operable by one control system for controlling the supply of pressure fluid to said power means, second flow control means operable by another control system for controlling the supply of pressure fluid to said power means, third flow control means having first and second positions and being biased to said first position for cutting off the supply of pressure fluid to said first flow control means, locking means capable of temporarily locking said second flow control means in an inoperative position, means operable for supplying pressure fluid to said third flow control means and said locking means, whereby said third flow control means is urged to said second position to render said first flow control means effective for control of said power means and whereby said locking means provides a predetermined force to lock said second flow control means in an inoperative position, and means providing a force greater than said predetermined force for overcoming said predetermined force so as to adjustably position said locking means to render said second flow control means effective for control of said power means and said locking means including conduit means therein effective upon such positioning of the locking means to vent the pressure fluid from said third flow control means so that the latter is returned to said first position and said first flow control means is rendered ineffective.

7. In a servosystem for a craft, a fluid operated power means for moving a surface of the craft, first and second flow control means selectively effective for controlling said power means, automatic means for operating said first flow control means, fluid operated means connected to said second flow control means to normally prevent said second flow control means from operating said power means, auxiliary control means selectively positioned to render inoperative said first flow control means, manual means operatively connected to said second flow control means, and valve means operated by manual operation of said manual means to cause said auxiliary control means to be selectively positioned so as to render said first flow control means inoperative to automatic operation, and said manual operation of said manual means being effective to overpower said fluid operated means and provide for control of said power means manually by said second flow control means.

References Cited in the file of this patent

UNITED STATES PATENTS

| | | |
|---|---|---|
| 1,375,269 | Akemann | Apr. 19, 1921 |
| 2,055,530 | Hallenbeck | Sept. 29, 1936 |
| 2,262,126 | Whittles | Nov. 11, 1941 |
| 2,512,013 | Down | June 20, 1950 |
| 2,615,432 | Meddock | Oct. 28, 1952 |
| 2,635,584 | Jacques | Apr. 21, 1953 |
| 2,652,812 | Fenzl | Sept. 22, 1953 |
| 2,738,772 | Richter | Mar. 20, 1956 |